United States Patent [19]

Legg et al.

[11] 4,374,095

[45] Feb. 15, 1983

[54] METHOD AND APPARATUS FOR RESTRAINING RADIAL FLOW CATALYTIC REACTOR CENTERPIPES

[75] Inventors: Douglas J. Legg, Portola Valley; Ben G. Burke, Lafayette, both of Calif.

[73] Assignee: Chevron Research Company, San Francisco, Calif.

[21] Appl. No.: 316,547

[22] Filed: Oct. 29, 1981

[51] Int. Cl.³ .......................... B01J 8/02; B01J 35/02
[52] U.S. Cl. ..................... 422/218; 208/146
[58] Field of Search .............. 422/218, 220, 222, 232, 422/233, 310, 311; 208/146; 285/18, 24, 31

[56] References Cited

U.S. PATENT DOCUMENTS

| | | | |
|---|---|---|---|
| 2,614,033 | 10/1952 | Cornell et al. | 422/218 |
| 2,634,194 | 4/1953 | Nebeck | 422/218 |
| 2,635,989 | 4/1953 | Bonner | 422/218 X |
| 2,639,224 | 5/1953 | McAfee | 422/218 |
| 2,683,654 | 7/1954 | Bergman | 422/218 |
| 2,997,374 | 8/1961 | Lavender, Jr. et al. | 422/218 |
| 3,027,244 | 3/1962 | Byrne et al. | 422/218 |
| 3,167,399 | 1/1965 | Hansen, Jr. | 422/218 X |
| 4,033,727 | 7/1977 | Vautrain | 422/218 |
| 4,244,922 | 1/1981 | Burke et al. | 208/146 X |
| 4,276,265 | 6/1981 | Gillespie | 422/218 X |

*Primary Examiner*—Richard L. Chiesa
*Attorney, Agent, or Firm*—Burns, Doane, Swecker & Mathis

[57] ABSTRACT

In a radial flow catalytic reactor, a gravity supported centerpipe is restrained from vertical upward movement due to thermal cycling of the catalyst and the reactor internals and/or the reactor and/or changes in process fluid flow conditions by forming the centerpipe with a taper, either continuous or stepped to have a generally frustoconical configuration. Gravity effect of the catalyst particles forming the bed act along the tapered sides of the centerpipe. Additionally improved radial flow through the uniformly packed catalyst bed, is achieved by the tapered conical shape of the centerpipe by gradually increasing the volume of the centerpipe along the length of the catalyst bed to accommodate ever increasing fluid flow from top to bottom through the radial bed.

6 Claims, 7 Drawing Figures

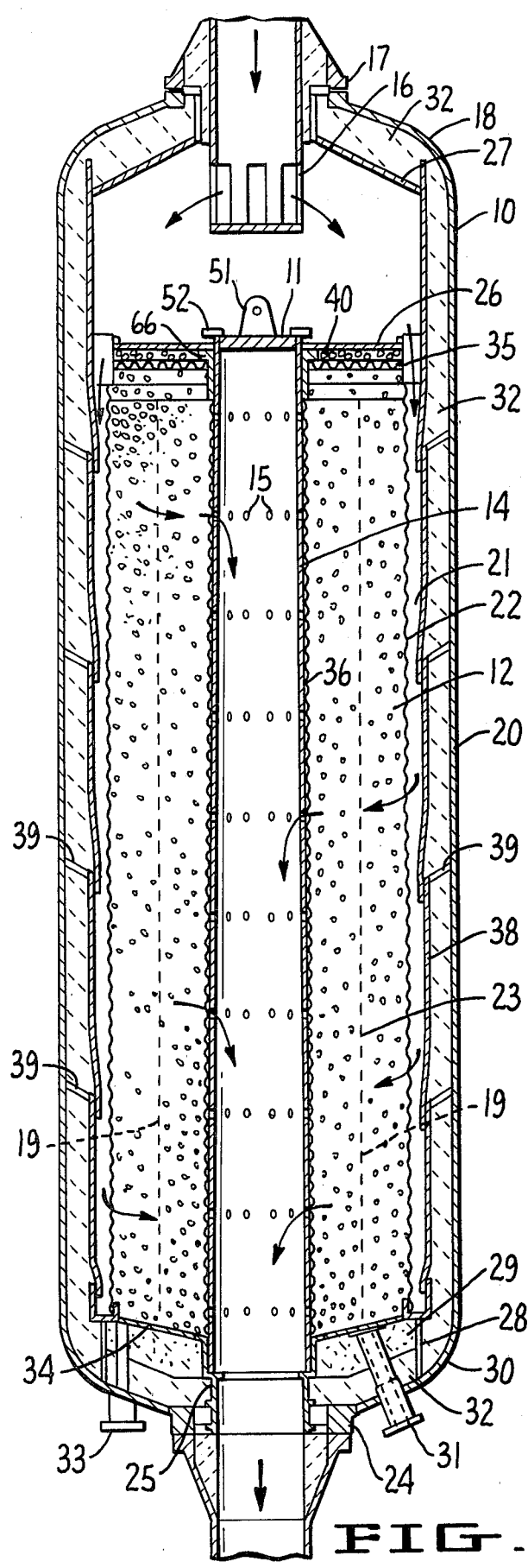
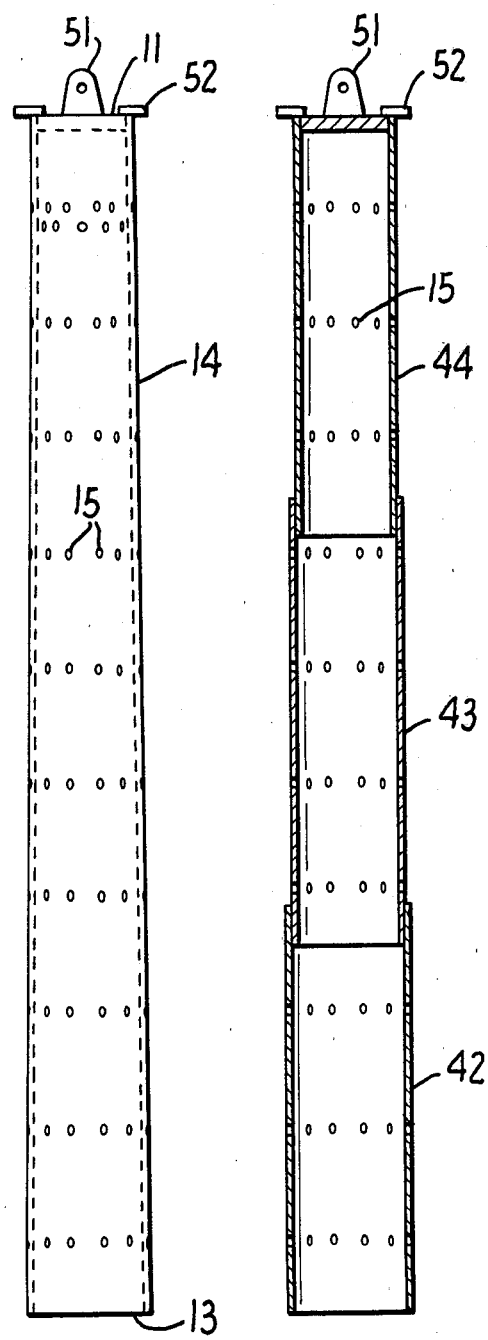
FIG. 1.
FIG. 2.
FIG. 3.

METHOD AND APPARATUS FOR RESTRAINING RADIAL FLOW CATALYTIC REACTOR CENTERPIPES

FIELD OF THE INVENTION

This invention relates to radial flow catalytic reactors. More particularly it relates to a method of and apparatus for operating a radial flow reactor to restrain unwanted movement of the perforated centerpipe thought to be due to differences of thermal expansion of vessel internals and/or portions of the vessel structure and/or volumetric expansion of the catalyst bed due to temperature, and/or the introduction of the hydrogen-hydrocarbon process fluid mix during such catalytic reaction of hydrocarbons and co-incidentally to improve the uniformity of radial flow through the catalyst bed along the length of the centerpipe.

DESCRIPTION OF THE PRIOR ART

It is a particular object of the invention to restrain vertical movement of a centerpipe in a radial flow catalytic reactor. In general, the "internals" of such a radial flow reactor are gravity supported in a vertically elongated vessel and all such internals are inserted and removed through an enlarged opening, such as a manway, in the upper wall of the vessel. ("Internals" as used herein refers to the centerpipe, contact or catalyst particles, and catalyst retaining screens forming the catalyst bed and providing annular space between the outer circumference of the bed and the vessel sidewall and an inner cylindrical space to an exit from the vessel.) Such a radial flow reactor usually operates at very elevated temperatures, (800° to 1000° F. or so) and it is sometimes the practice to insulate the interior face of the steel wall of the vessel so that the metal operates at lower temperatures (but still quite hot, sometimes as high as 400° to 500° F.). To avoid heat conduction from the metal vessel internals to the vessel walls, the large internals are essentially gravity supported on a few low thermal conductivity paths (e.g., thin web supports and the like), which may be welded to a vessel wall or vessel nozzle or exit pipe in the bottom wall of the vessel.

Radial reactors are frequently used in hydroprocessing of hydrocarbons. In such processing, hydrogen is used at high temperatures and at pressures of 200 psig or more to influence the cracking, isomerization or reforming of such hydrocarbons. To contain the high pressure and to prevent hydrogen attack of the steel vessel walls (due to hydrogen interaction with carbon in the steel) it is customary to build such vessels of relatively thick (up to 3 in. or more) low alloy (carbon-moly or chrome-moly) steels. The ASME Pressure Vessel Code requires that vessels built of such steels in such thicknesses be heat treated after welding. Such vessels (which may be as long as 20 to 40 feet and as great as 10 to 30 feet in diameter) are usually heat treated as a single entity. After such post weld heat treatment it is undesirable to affix by welding any portion of the removable internals to that vessel since that would require reheat treatment of the vessel each time they might be welded to the vessel. Further, it is highly desirable to be able to remove the major internals for cleaning and inspection of the vessel at periodic intervals so as to assure its structural integrity and safety. In addition, apart from the need for heat treatment, it would be time consuming to cut out and re-weld welded-in internals which would involve added hazard of fire or explosion to the inspection operation. Furthermore, repeated cutting, welding and heat treatment ultimately could be damaging to the vessel metal. Accordingly, it is conventional practice to support all major internals, including specifically the centerpipe, by gravity on the bottom wall of such a vessel.

In radial flow reactors, fluid reactant generally enters the top of the vessel, flows downwardly in the annular space between the outer catalyst retaining screens and the vessel wall, and then passes radially inward through the catalyst bed to the perforated centerpipe. Fluid in the centerpipe then leaves through an outlet at the bottom of the vessel. Alternatively, flow into a radial flow vessel may be inverted so that reactant enters the bottom periphera of the vessel, flows upwardly in the annular space between the vessel wall and catalyst bed, passes through the bed and leaves through a centerpipe communicating with a central lower outlet. Reverse flow is also possible. In such an arrangement, inlet flow of reactant fluids is upwardly in centerpipe, radially outward through the catalyst bed and out of the top or bottom of the vessel.

For maximum efficiency it is desirable that flow across the catalyst bed be radially uniform over the length of the generally cylindrical volume forming the bed. Catalyst particles may have a tendency to classify over an extended vertical bed so that smaller catalyst particles may be concentrated at the bottom. This can result in a bed having less radial permeability near the bottom than near the top. Further, if the flow is downward around the bed, the difference in pressure between the annular space and the centerpipe is greater at the top of the bed than at the bottom due to flow. Accordingly, flow through the bed might "channel" or preferentially flow through the upper portion of the bed. Accordingly, it is common practice to have a greater number or larger perforations near the lower end of the centerpipe than at the top to make the flow more uniform. In any event, there is an ever increasing amount of fluid in the centerpipe as flow progresses toward the reactor outlet.

As also mentioned above, conventional radial reactors are usually subjected to temperature cycling, an alternate increase and decrease in the temperature of the vessel and its contents. The cycles are frequently from 200° to 500° C. or more in magnitude. Temperature cycling occurs, for instance, when an apparatus is heated and brought into service at the elevated operating temperature and subsequently withdrawn from service and cooled. Temperature cycling also occurs when contact material in the vessel is regenerated at an elevated temperature, or when there is a change in rate of feed and/or variations in catalytic reactions. Apparatus employed in catalytic hydrocarbon conversion processes such as reforming, isomerization, hydrodesulfurization and hydrocracking are especially subject to temperature cycling. Because radial flow vessels of conventional design have removable, gravity supported vertical members such as centerpipes and contact material retaining screens, the problem is that these members tend to migrate vertically upward in the bed of catalyst material with each temperature cycle.

The reasons for such net upward migration of a centerpipe or retaining screens are not completely understood. One theory is that the centerpipe and retaining screens, upon being heated, expand in an upward direction, but upon being cooled, they contract from both ends toward a central neutral point. Thus, with each cycle, there is a net upward movement. Another theory is that the catalyst bed swells up (boils up) and lifts the centerpipe and screens and leaves them there when the catalyst settles down upon cooling. Whatever the reason, the upward migration, or the "ratcheting" is frequently up to 1 centimeter or more on each cycle. Eventually the member will rise enough from its mounting socket, or seat, to allow unwanted movement of the catalyst. In the case of the centerpipe, if it moves away from the socket at the base of the vessel, it will provide an opening through which contact material may flow and escape from the vessel and enter subsequent vessels such as heat exchangers and therefore require plant shutdown. This can be very costly from the standpoint of direct expense of maintenance work, lost processing production, and loss of very expensive catalyst material which is usually not recoverable. Upward movement of a retaining screen around the periphera of the catalyst bed may lead to a drop in the level of contact material as the contact material fills the space under the screen and/or between the screen and the vessel wall. Displacement of the catalyst may also obstruct flow of the reactant in the annulus which can cause uneven flow in the catalyst bed and possible coking and damaging local temperature rises. The effect of both a drop in catalyst level and a rise of the centerpipe is to decrease the depth of the contact material seal above the top perforation in the centerpipe. The decreased seal allows some of the feed to entirely bypass the contact material, which leads to loss of product quality. (As used herein, "contact material" includes catalyst particles, as well as inert, or low catalytically active, particles).

One arrangement for restraining centerpipe movement is shown and described in our U.S. Pat. No. 4,244,922, issued Jan. 13, 1981, assigned to the assignee of this application. In that patent a horizontal surface is secured to the centerpipe in such a position that it carries a portion of the weight of the catalyst bed. The horizontal surface is in the form of a disk which either is secured to the pipe or rests upon a flange affixed to the centerpipe. This arrangement is quite satisfactory to prevent centerpipe vertical movement but presents some problems. If the flange is permanently fixed to the centerpipe, as by welding, the increased diameter interferes with insertion and removal of the pipe through the vessel manway. Further it may interfere with visual alignment and landing of the base of the centerpipe in the vessel support socket.

U.S. Pat. No. 4,033,727—Varitrain, issued July 5, 1977; U.S. Pat. No. 3,167,399—Hansen, issued Jan. 26, 1965 and U.S. Pat. No. 3,027,244—Byrne et al, issued Mar. 27, 1962, each discloses radial flow reactors having uniform diameter centerpipes which appear to be gravity supported on the bottom wall of the vessel, but without means for preventing upward movement of the centerpipe.

U.S. Pat. No. 2,997,374—Lavender et al, issued Aug. 22, 1961 discloses a radial flow reactor in which the centerpipe is welded to the bottom wall of the reactor vessel.

U.S. Pat. No. 2,635,989—Bonner, issued Apr. 21, 1953 discloses in one form a radial flow reactor in which the centerpipe enters either the top or bottom of the reactor and is composed of a vertical series of cones or cylinders of decreasing diameter from the inlet to the outlet end of the vessel. The sections are either welded together, or each section frictionally fitted to the adjacent section.

SUMMARY OF THE INVENTION

In accordance with the present invention a uniformly increasing conduit for receiving a uniformly increasing amount of product fluid is achieved and the centerpipe is restrained from rising vertically under thermal cycling by forming such centerpipe in a generally conical form with the diameter tapering inwardly from the gravity support at the bottom end wall of the reactor vessel toward the upper end wall. With the centerpipe having increased perforations toward the lower end and the outer periphera of the cylindrical catalyst bed having uniform spacing from the sidewall of the vessel, radial pressure drop across the bed is made more uniform throughout the length of the catalyst bed to improve catalyst contact with reactant fluids in, and hence product yield from, the reactor. To permit gravity support for the centerpipe the vessel's lower end wall includes a seat, or socket, sufficiently deep to support the central pipe in an erect position. Segments, or arcuate sections, of screens disconnectably attached to each other are placed adjacent the vessel sidewall to enclose a generally cylindrical bed of retained catalyst particles. Such segments likewise extend a desired distance above the centerpipe to assure that the topmost ports, or perforations, of the pipe are covered by catalyst particles to a desired depth. The top of the catalyst bed supports a plurality of arcuate plates, or segments, to vertically confine the bed and direct incoming flow to the peripheral annular space. Further, the vertical screen segments are radially spaced from the vessel sidewall to provide an annular flow path along the length and around the circumference of the catalyst bed so that reactant may flow more uniformly through the catalyst bed to the perforated centerpipe. In a preferred form, flow control perforations in the centerpipe are circular of increasing number or diameter toward the outlet end and covered with catalyst retaining screen that generally conforms to the conical shape of the centerpipe. This permits substantially uniform flow through the catalyst bed throughout the length of the centerpipe without substantial movement of catalyst particles therethrough.

BRIEF DESCRIPTION OF DRAWINGS

In the drawings:

FIG. 1 is a vertical elevation view, partially in cross-section, of a radial reactor vessel suitable for performing the method of the present invention including a preferred embodiment of a conically tapered centerpipe;

FIG. 2 is a vertical elevation view of the centerpipe shown in FIG. 1;

FIG. 3 is a vertical elevation view, in cross section, of an alternative form of a vertically tapered centerpipe formed of sections of cylindical pipe having successive smaller diameters;

DETAILED DESCRIPTION OF THE PREFERRED EMBODIMENTS

Figure 4:
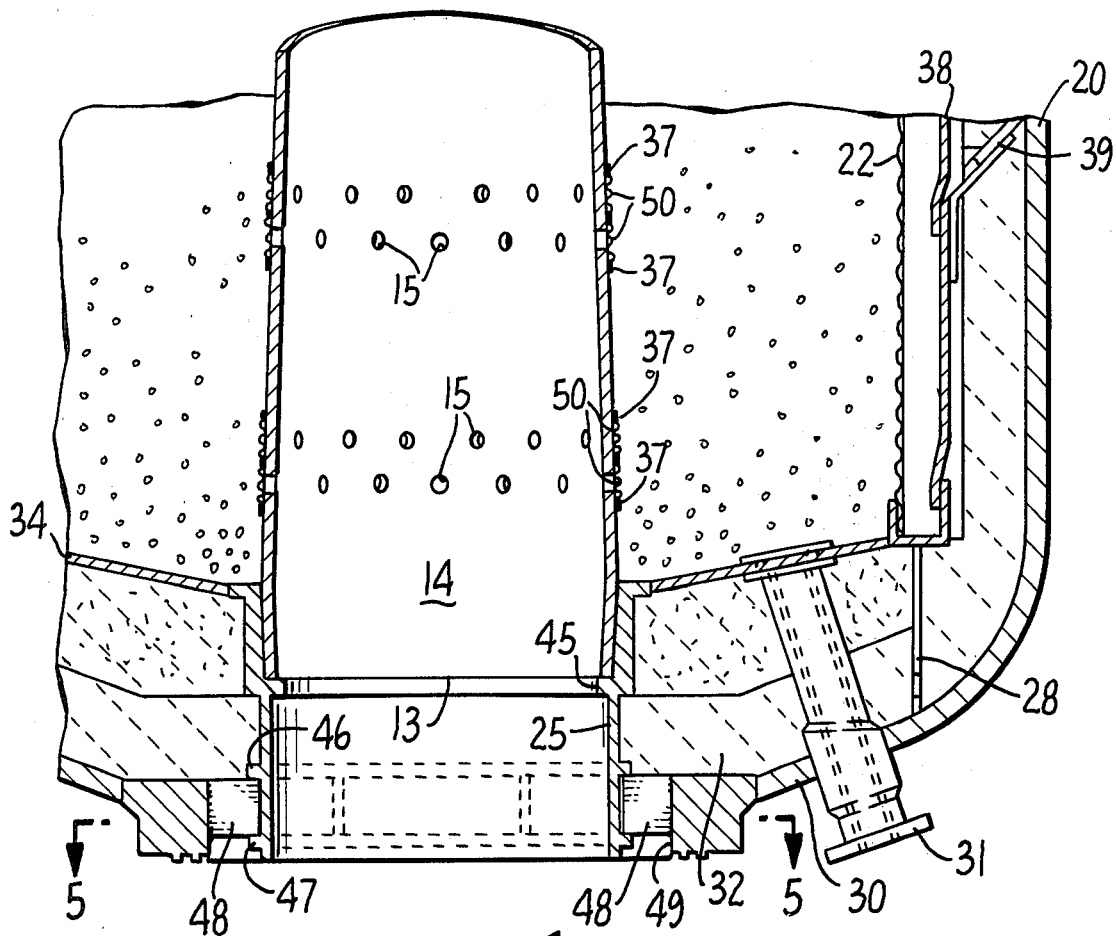
FIG. 4 is an enlarged view of the lower end of the embodiment shown in FIG. 1, particularly illustrating socket 25 and the seating arrangement for centerpipe 14.

Referring now to FIG. 1 of the drawing, a radial flow reactor vessel 10 supports a generally cylindrical bed 12 of catalyst particles. A tapered or frustoconical centerpipe, or conduit member, 14 constructed in accordance with our invention extends vertically and axially through bed 12. Flow of hydrocarbons to be processed in bed 12 (as indicated by arrows) is from inlet distributor 16 in manway 17 through the upper end wall 18 of vessel 10, and into bed 12 from the annular space 21 between sidewall 20 of vessel 10 and the retaining screen means 22 for bed 12. Tapered centerpipe 14 is perforated, as by holes 15 along its length to permit flow therethrough and out of vessel 10 through the outlet opening in flange 24. As indicated, holes 15 may be drilled through pipe 14 in rows or groups of rows. Desirably, such passageways are larger in diameter or greater in number toward the outlet end of pipe 14.

Figure 7:
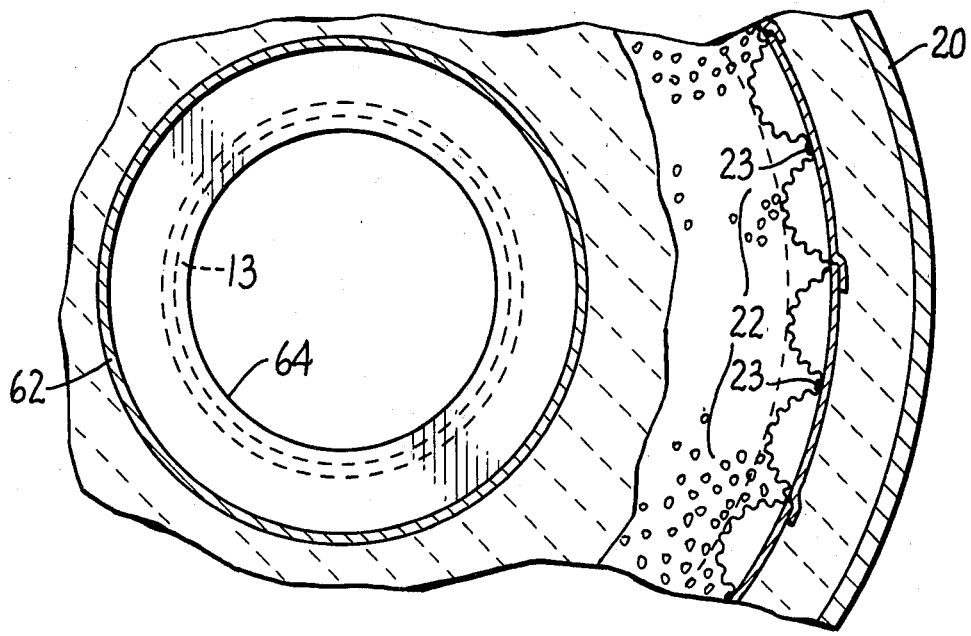
FIG. 7 is a partial cross-sectional view taken in the direction of arrows 7—7 in FIG. 6.

Desirably the entire assembly of centerpipe 14, retainer screen 22, formed in a plurality of segments 23, (as best seen in FIG. 7 and indicated by dash lines 19 in FIG. 1), catalyst bed 12 and cover 26, likewise formed by segments, is supported by gravity on lower end wall 30, including vertical support ring 28. As indicated, support ring 28 provides a base for screen segments 23. Because vessel 10 in the present embodiment is intended to operate as a relatively "cold" wall reactor, the side wall and top wall of vessel 10 is coated with insulative concrete aggregate 32 to provide the necessary insulation to keep the metal of the vessel walls below a maximum desirable temperature during operations. The bottom wall of vessel 10 may be covered with cast refractory, fire bricks, or coarse sand or a combination of such insulating materials and may or may not be covered by metal plate 34 to provide a base for catalyst bed 12. Then it is often customary to protect that insulation by covering it with an internal shroud 38 which may be made up of cylindrical segments, the lower segment of which is also mounted on support ring 28. The upper segments are supported and spaced from outer wall 20 by canted annular rings 39. Rings 39 are vertically spaced apart and as with ring 28 are relatively thin compared to their length to form low thermal conductive paths between shroud 38 and outer vessel wall 20. The internal volume of vessel 10 is insulated from upper wall 18 by a spacer, such as annular disc 27.

As discussed above, it is essential that all portions of the internals (apart from the thermal insulation means and shrouding and small supports) of vessel 10 be removable, as through manway 17 in upper end wall 18. For this reason tapered centerpipe 14 must be removable. Accordingly, to support tapered centerpipe 14 in a vertical position, substantially coaxial with vessel 10, a socket or support seat 25 is formed integral with outlet 24.

Figure 5:
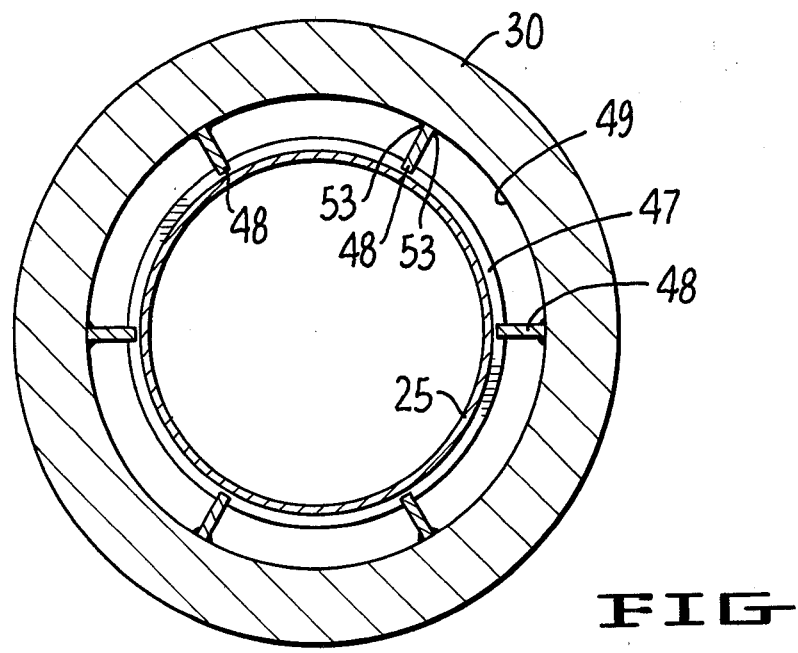
FIG. 5 is a partial plan view of the support webs for socket 25 taken in the direction of arrows 5—5 in FIG. 4.

The construction of socket 25 is best seen in FIGS. 4 and 5. As there shown, socket 25 is cylindrical with an internal ring seat 45 for the lower end 13 of centerpipe 14 and a pair of external mounting collars 46 and 47. Radial ribs 48 welded to the inner circumference of opening 49 in lower well 30 of vessel 10 secure socket 25 in place. It is to be particularly noted that each rib 48 is thin as compared to its radial length and is secured only to opening 49 by welds 53 to assure a low heat conductivity path from collars 46 and 47 of socket 25 to wall 30 of vessel 10. Desirably the length of socket 25 is as short as possible, (on the order of 2 to 6 inches) for a centerpipe having a length of 20 to 30 feet. Although socket 25 may be tapered outwardly a few degrees (as particularly shown in the FIG. 6 embodiment) to assist insertion and removal of centerpipe 14, in general it is preferably cylindrical along its length. If tapered, the angle should be kept small to minimize the opening which would form around the outer surface of centerpipe 14 at its lower end 13, if the centerpipe 14 should migrate upward. This prevents catalyst fines or particles from escaping through the socket if centerpipe 14 should "creep" upward under variable thermal conditions, or thermal cycling.

Figure 6:
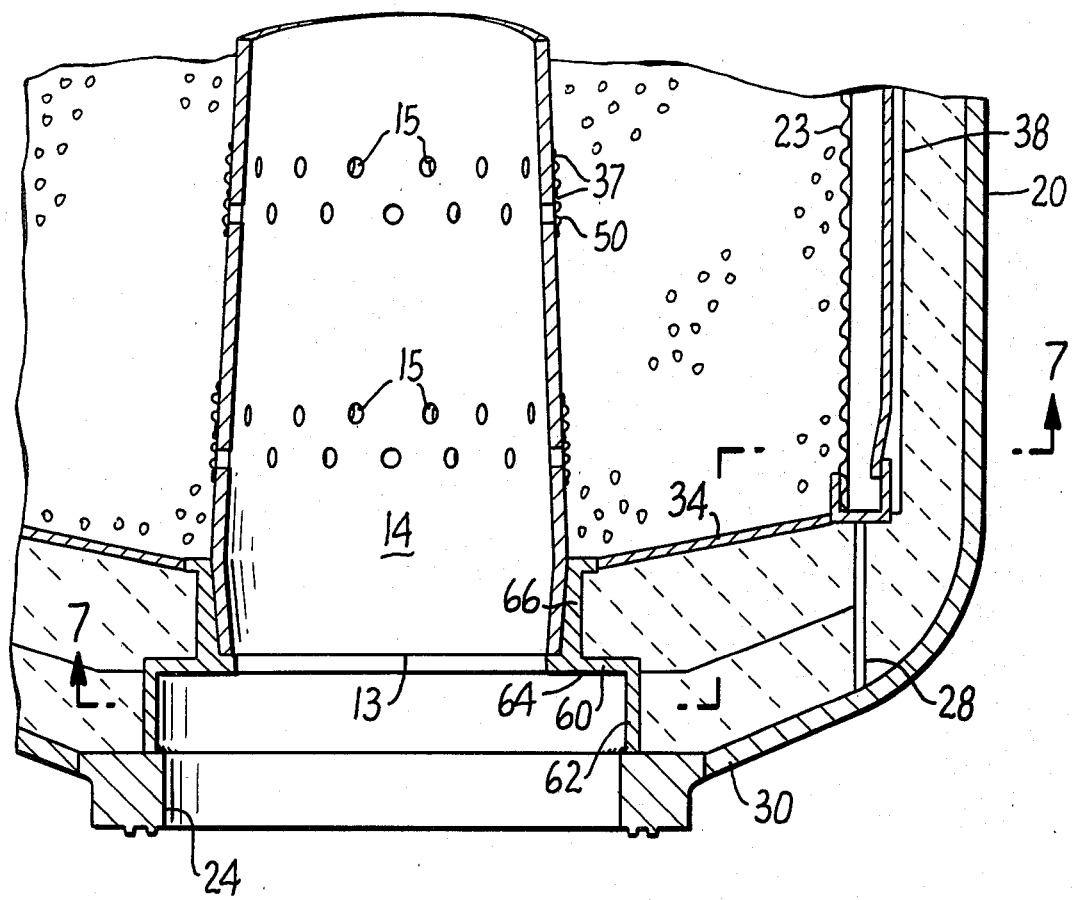
FIG. 6 is a partial vertical cross-sectional view, similar to FIG. 4, showing an alternate socket arrangement for the lower end of the conical centerpipe.

An alternate form of socket for lower end 13 of tapered centerpipe 14 is shown in FIGS. 6 and 7. As particularly distinguished from webs 48 and collars 46 and 47 of FIGS. 4 and 5, a ring member 60 includes a cylindrical base wall 62 which is welded to lower end wall 30 and concentric with outlet 24. A central annular wall 64 of ring 60 forms a base for end 13 and together with collar section 66 forms the centerpipe socket member. One particular advantage of the arrangement of FIGS. 6 and 7 is the small obstruction to flow of product from a centerpipe 14 through outlet 24. Another advantage is greater stability of the socket during installation of the centerpipe.

As shown, particularly in FIG. 2, the configuration of centerpipe 14 is as a frustoconical section from its generally cylindrical support end 13 to closed end 11. Such form provides a gravity restraining force along the length of pipe 14 from the gravity effect of the freely movable catalyst particles. The gravity effect may be applied through action of the catalyst particles on overlying screen 36, as in FIG. 1, or directly to the wall of pipe 14, as in the arrangement of FIG. 4. Such gravity effect prevents upward creep of pipe end 13 out of socket 25. Distribution of gravity force on pipe 14 readily holds it axially in a center position within bed 12 and vessel 10, as well as preventing it from rising longitudinally. As noted above, such longitudinal or vertical creep in previously known radial flow reactors has resulted in escape of catalyst particles into the process effluent stream through its seat, such as 25.

Further, the gravity effect of catalyst particles on tapered centerpipe 14 prevents the upper end 11 from rising out of the top of bed 12. The segments forming cover 26 lie directly on a layer of spheres or balls 40 resting on screen 35 to close off the top of bed 12. The top of pipe 14 includes a shroud 66 to close off any ports 15 that might be uncovered by vertical movement of pipe 14. Thus, reactant fluids would not by-pass bed 12 with accompanying loss of efficiency or degradation of products.

A further significant advantage of the generally conical shape of centerpipe 14 is to improve flow throughout vessel 10. It has long been appreciated that radial flow vessels are subject to considerable variations in flow over various parts of the entire cylindrical body of catalyst particles. Under relatively low flow conditions and uniform permeability of the catalyst bed, catalytic reaction in such reactors is highly efficient. However, with high flow rates and non-uniform permeabilities, fluids "channel" or "stratify" through selected flow paths, generally those paths with the highest permeability. In part this is due to differences in pressure in the annular space from top to bottom of reactor 10 and resulting differences in resistance to flow across radial bed 12. To some extent the difference in total flow into centerpipe 14 may be accommodated by properly selecting the size and number of perforations in centerpipe 14, as described above. However, in accordance with the present invention, by reason of centerpipe 14 being conical in shape, increasing flow from top to bottom of centerpipe 14 is assisted by increased volume at the bottom relative to the top. Accordingly a more even distribution of fluid flow is obtained while at the same time centerpipe 14 is made resistant to vertical displacement due to thermal cycling.

As shown, pipe 14 is preferably a pure conical section with the diameter decreasing throughout its length from bottom 13 to top 11. However, as shown in FIG. 3, pipe 14 can be formed from a plurality of elongated sections of uniform diameter pipes, each slightly smaller in diameter from base end or bottom 13 to top 11. Such a structure as there shown comprises three cylindrical sections 42, 43 and 44 of decreasing diameter towards top 11 are used to form pipe 14. As shown, to assist in removal or installation of conical central pipe 14, a lifting lug or eye 51 is secured to upper end 11. Ring 52 on end 11 holds the segments of cover 26 in place on balls 40 over screen 35.

Pipe 14 is preferably covered throughout its length by an enclosing screen member 36. The inside of screen 36 may frictionally engage the outside of centerpipe 14, but preferably it is welded at a multiplicity of points such as 37 so that centerpipe 14 and screen 36 will move together, as for example, during installation. While screen member 36 is desirably a fine mesh, woven wire screen, it can also be formed of sheet steel slotted (preferably horizontally) or of closely spaced vertical bars to form such a screen. Member 36 may also take the form of individual screen covers 50 for each perforation or row of perforations 15 or groups of rows. In either case, members 36 are radially spaced at a constant distance from perforations 15 in centerpipe 14.

It is frequently desirable to be able to easily remove the catalyst bed before attempting regeneration of catalyst, or other servicing of reactor 10. Catalyst particles may be drained through flange 31 which penetrates through bottom plate 34. Flange 33 may be used to extract samples of catalyst particles during normal operation, as well as to assist in removing catalyst bed particles.

The present embodiment of the invention has been described in connection with flow of reacting hydrocarbons into vessel 10 by flow distributor 16 at the top of vessel 10 and effluent exiting through outlet 24 at the bottom of vessel 10. However, reverse flow from centerpipe 14 radially outward through bed 12 to annular space 22 is possible with all of the advantages retained for such conical centerpipe as to restraint against thermal movement. Likewise inward flow into the annular space around the outer perimeter of bed 12 may be upward with outward flow from centerpipe 14 also being downward through outlet 24.

While only a few examples of the preferred embodiment of the invention have been shown and described, various modifications or changes in both the method and apparatus will occur to those skilled in the art. All such modifications or changes coming within the scope of the appended claims are intended to be included therein.

We claim:

1. A method of preventing longitudinal displacement of the centerpipe of a radial flow catalytic reactor vessel due to thermal cycling of fluids flowing therethrough and differences in thermal expansion of said centerpipe and for increasing the volume thereof for increasing radial flow of reactant fluids through the catalyst bed along the length of said centerpipe which comprises positioning a centerpipe centralizing socket member in the lower end wall of said vessel, seating a centerpipe in said socket member extending axially parallel to a substantial portion of the sidewall of said vessel, said centerpipe being formed throughout its length as a frustoconical section whose diameter decreases from said socket member toward the upper end wall of said vessel and having a plurality of spaced openings throughout said length, covering at least said openings of said centerpipe with screen, enclosing said centerpipe within a generally cylindrical body of catalyst particles extending radially outward from said centerpipe adjacent to said vessel sidewall, and forming vertical passageways between said sidewall of said vessel and said body of catalyst particles to permit radial flow of reactant fluids through said body between said sidewall and said centerpipe, whereby increasing fluid flow into said centerpipe from across said body by radial flow therethrough is accommodated along the length of said frustoconical centerpipe and thermal cycling is resisted by the gravity component of said cylindrical catalyst bed along the surface of said frustoconical centerpipe.

2. In a radial flow reactor vessel having inlet and outlet passageways, means for retaining a generally cylindrical bed of catalyst particles extending through said reactor and so arranged as to permit radial fluid flow between the peripheral area of said cylindrical bed and the center of said bed, a perforated centerpipe member extending through said catalyst bed, said reactor having a sealable across opening in the upper end of said vessel for installation and removal of said catalyst particles, said perforated centerpipe member, and said retaining means, the improvement comprising a centerpipe seat member mounted at the lower end of said vessel, said centerpipe having one end formed to engage said seat member for support thereof and the diameter of said centerpipe being tapered inwardly from above said seat to the other end thereof;

screen means surrounding said centerpipe adapted to prevent catalyst particles from passing through the perforations in said centerpipe and means covering at least a portion of the upper end of said centerpipe to maintain the perforations of said centerpipe within said cylindrical bed of said catalyst particles.

3. A centerpipe in accordance with claim 2 wherein, the taper of said centerpipe is formed by a plurality of axially aligned cylindrical sections of decreasing diameter from said one end.

4. Apparatus in accordance with claim 2 wherein the taper of said centerpipe is formed as a frustoconical member decreasing in diameter from said one end.

5. A method of assembling a catalytic reactor vessel having an inlet flow passageway in its upper end wall wherein fluids entering therethrough for reaction in said vessel flow between the sidewall of said vessel and a perforated central conduit extending substantially coaxially with said sidewall, which comprises positioning a centralizing socket member on the lower end wall of said vessel, said socket member providing a flow path for reactant fluids out of said vessel, seating said conduit in said socket member sufficiently deep to maintain said conduit in a vertical position and extending axially parallel over a substantial portion of the sidewall of said vessel, said conduit being tapered throughout its length so that the diameter thereof decreases toward the upper end wall of said vessel, said tapered conduit member having a plurality of uniformly spaced openings throughout said length, covering at least said openings of said conduit member with catalyst particle retaining screen means, enclosing at least the said openings in said tapered conduit within a cylindrical body of catalyst particles extending radially outwardly from said tapered conduit toward said sidewall, and forming vertically elongated passageways in the annular space between said sidewall and said body of catalyst particles to permit radial flow of reacting fluids between said annular space and said conduit through said catalyst body so that the increasing fluid flow between said upper end wall and said lower end wall across said radial bed is accomodated by the increasing volume of said tapered conduit and the taper of said conduit permits the vertical component of gravity to act on the side of said conduit to resist vertical unseating of said conduit from said socket member due to thermal cycling of said catalyst, said centerpipe and said vessel.

6. Method of assembling a hydroprocessing reactor wherein an axially elongated reactor vessel includes an internal structure permitting radial flow between the central portion of said vessel and the axially elongated walls of said vessel, said internal structure being removable through an access opening in the upper wall of said vessel and said internal structure supported by gravity on the lower end wall of said vessel, which comprises positioning a centralizing socket member to communicate with a flow passageway through said lower end wall of said vessel, seating a perforated centerpipe member in said socket member to position said centerpipe vertically and axially parallel to a substantial portion of said sidewall of said vessel, said centerpipe member being formed throughout its length as a conical section whose diameter decreases from said socket member toward said upper end wall, covering said perforated centerpipe with catalyst particle retaining means, enclosing said centerpipe within a body of catalyst particles extending outwardly from said centerpipe, confining said particles adjacent said vessel sidewall to form an annular vertical passageway between said vessel sidewall and said body of catalyst particles to permit radial flow of reacting fluids from the cylindrical surface of said body to said centerpipe whereby thermal cycle lifting of said centerpipe is resisted by the gravity effect of said catalyst particles against the surface of said conical section and an increasing volume for radial flow into said perforated centerpipe is provided throughout the length thereof.

* * * * *